United States Patent [19]

O'Brien

[11] E Re. 29,372

[45] Reissued Aug. 30, 1977

[54] APPARATUS FOR AUTOMATICALLY STACKING AND COMPRESSING BATTS OF COMPRESSIBLE MATERIAL

[75] Inventor: Theodore Earl O'Brien, Watford, Canada

[73] Assignee: Patco Packing Limited, Sarnia, Canada

[21] Appl. No.: 712,820

[22] Filed: Aug. 9, 1976

Related U.S. Patent Documents

Reissue of:

[64] Patent No.: 3,908,539
Issued: Sept. 30, 1975
Appl. No.: 505,805
Filed: Sept. 13, 1974

[51] Int. Cl.[2] ..... B30B 15/30

[52] U.S. Cl. ..... 100/49; 53/124 D; 100/215; 100/218; 100/226; 100/272

[58] Field of Search ..... 53/124 D; 100/187, 45, 100/49, 209, 215, 218, 219, 226, 220, 272, 275, 276, 277

[56] References Cited

U.S. PATENT DOCUMENTS

| | | | |
|---|---|---|---|
| 2,933,314 | 4/1960 | Stobb | 100/215 X |
| 3,437,033 | 4/1969 | Day et al. | 100/220 |
| 3,721,060 | 3/1973 | Quinto | 100/215 X |
| 3,824,759 | 7/1974 | Finn et al. | 53/124 D X |

*Primary Examiner*—Billy J. Wilhite
*Attorney, Agent, or Firm*—Fetherstonhaugh & Co.

[57] ABSTRACT

Apparatus for stacking and compressing batts of compressible material comprising a vertical stacking chamber, indexing gates in the upper portion of said stacking chamber normally disposed to receive batts, an indexing and compression plate, means for repeatedly cycling said indexing and compression plate around a first path a predetermined number of times and then around a second path once, said first path extending upwardly of the outside of said stacking chamber laterally into said stacking chamber at a level above said indexing gates, downwardly in said stacking chamber, through said indexing gates, and laterally out of said stacking chamber, said second path extending upwardly of the outside of said stacking chamber, laterally into said stacking chamber, downwardly in said stacking chamber to a compression level in the lower portion thereof that is below the extent of downward travel of said first path and laterally out of said stacking chamber, said indexing gates being operable in response to the passage therethrough of said indexing and compression plate to permit said indexing and compression plate to carry batts thereon to the portion of said stacking chamber therebelow, an ejection passage extending across said stacking chamber at the lower end thereof and below said compression level through which batts underlying said index and compression plate at the compression level can be laterally removed from said stacking chamber, means for ejecting batts underlying said indexing and compression plate when said indexing and compression plate is at said compression level, means for causing said means for repeatedly cycling said indexing and compression plate being adapted to remove said compression plate out of said stacking chamber on said second path after operation of said means for ejecting batts.

2 Claims, 10 Drawing Figures

APPARATUS FOR AUTOMATICALLY STACKING AND COMPRESSING BATTS OF COMPRESSIBLE MATERIAL

Matter enclosed in heavy brackets [ ] appears in the original patent but forms no part of this reissue specification; matter printed in italics indicates the additions made by reissue.

This invention relates to apparatus for stacking and compressing batts of compressible material, such as glass fiber insulation.

Batts of glass fiber insulation are commonly manufactured in lengths of four feet and widths of fifteen inches. While this size is most common, other sizes are also made. For example, it is not uncommon to make batts of lengths of eight feet and of widths other than fifteen inches for special purposes. The rectangular dimensions of the batts are not important to the invention. The batts are usually about two and one-half inches thick in their uncompressed state, but other thicknesses are also common. The common practice is to stack batts in a stacking chamber, compress them with a compression plate and then eject them in compressed state [latterally] *laterally* from the staking chamber into a container. They are shipped in the container in the compressed state.

The common practice in compressing and packaging glass fiber batts has been to manually remove the batts from a production line and place them in a stacking chamber for compression. It is usual to have about five men placing batts into a single stacking chamber. Attempts have been made to automate the stacking and compressing operation, but, they have not been successful and at the present time, the manual method of stacking and compressing batts of glass fiber material continues to be used.

This invention relates to an apparatus for stacking and compressing batts in an automatic manner. It is an apparatus that is designed to receive the batts by means of a conveyor from the production line and to compress and bag them without manual feed or manipulation.

It is, therefore, an object of this invention to provide a simple apparatus for stacking and compressing batts that can accept the batts on a continuous basis.

It is a further object of the invention to provide an apparatus for stacking and compressing batts of a compressible material such as glass fiber that is compact.

It is a further object of the invention to provide an apparatus for stacking and compressing batts of compressible material that is simple and easy to maintain.

Apparatus for stacking and compressing batts of compressible material comprising a vertical stacking chamber, indexing gates in the upper portion of said stacking chamber normally disposed to receive batts, an indexing and compression plate, means for repeatedly cycling said indexing and compression plate around a first path [a predetermined number of times] and [then] around a second path [once], said first path extending upwardly of the outside of said stacking chamber laterally into said stacking chamber at a level above said indexing gates, downwardly in said stacking chamber, through said indexing gates, and laterally out of said stacking chamber, said second path extending upwardly of the outside *of* said stacking chamber, laterally into said stacking chamber, downwardly in said stacking chamber, to a compression level in the lower portion thereof that is below the extent of downward travel of said first path and laterally out of said stacking chamber, said indexing gates being operable in response to the passage therethrough of said indexing and compression plate to permit said indexing and compression plate to carry batts therein to the portion of said stacking chamber therebelow, an ejection passage extending across said stacking chamber at the lower end thereof and below compression level through which batts underlying said index and compression plate at the compression level can be laterally removed from said stacking chamber, means for ejecting *compressed* batts underlying [said indexing and compression plate when said indexing and compression plate is at said compression level,] *said compression level subsequent to their compression by said compression plate,* means for causing said means for repeatedly cycling said indexing and compression plate being adapted to remove said compression plate out of said stacking chamber on said second path [after operation of said means for ejecting batts].

The invention will be clearly understood after reference to the following detailed specification read in conjunction with the drawings.

Figures 1, 1A:
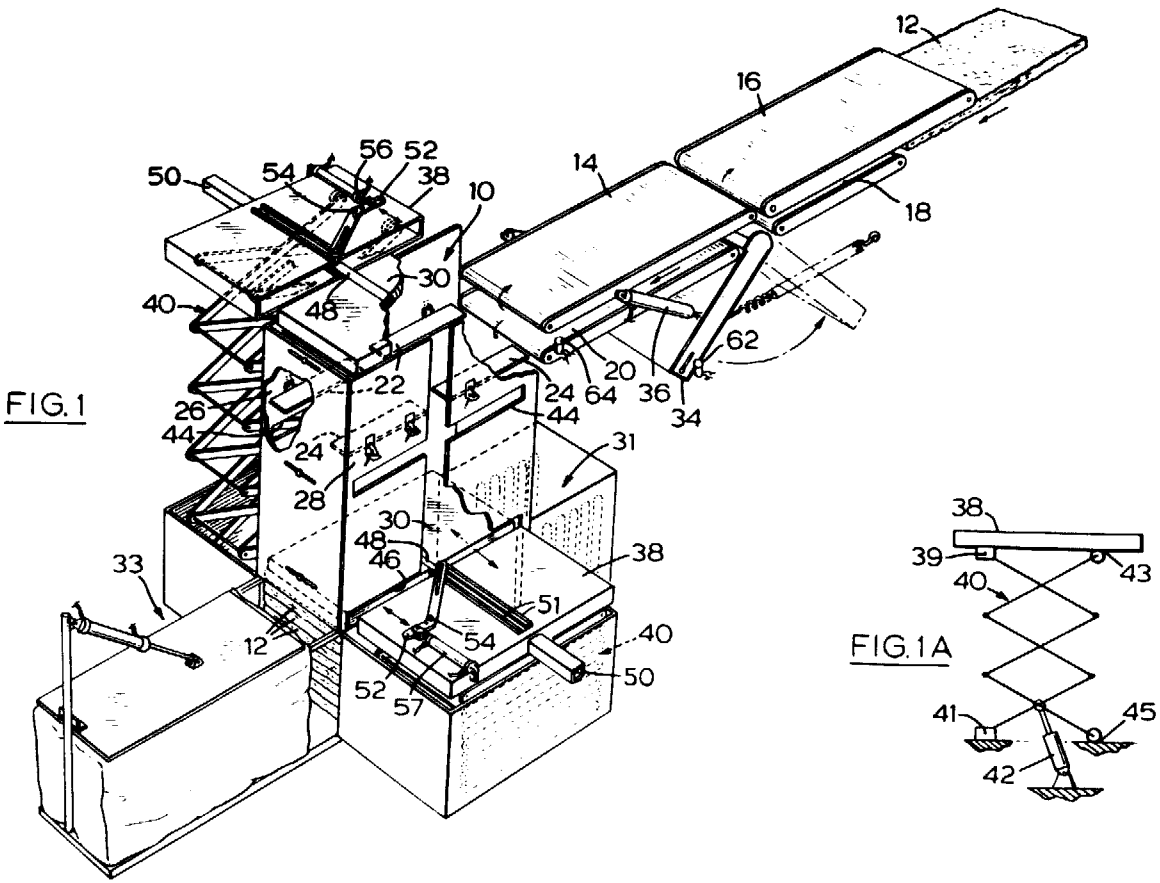
FIG. 1 is a perspective illustration of apparatus according to the invention.
FIG. 1A is a schematic illustration of the lifting mechanism for the compression plates.

In the drawings, the numeral 10 refers to a stacking chamber for batts 12 of a compressible material such as glass fiber. As indicated in the preamble to this application, glass fiber batts are customarily made in various sizes. A common size is four feet long, fifteen inches wide and two and one-half inches deep. The vertical walls of the stacking chamber are spaced to guide batts of the size being packaged into a vertical stack. Stacking chambers for batts and their construction are well known and detailed reference to the construction will not be made in this application.

Figure 5:
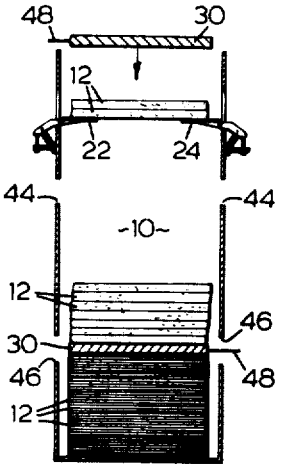
FIGS. 5, 6, 7 and 8 are a series of sectional end elevations illustrating the cyclic motion of the indexing and compression plates and the compressing action of the indexing and compression plates.

The batts are continuously fed to the stacking chamber between co-operating feed belts 14, 16, 18 and 20. They are picked up continuously by the feed belts but, as will be described, are deposited on the indexing gates 22 and 24 intermittently and stacked two deep. Indexing gates 22 and 24 consist of rectangular panels hinged to the back wall 26 and the front wall 28, respectively, of the stacking chamber. They are spring urged by springs 29 to normally assume the horizontal solid line positions illustrated in FIGS. 5, 6, 7 and 8, in which they are adapted to receive batts 12 of glass fiber from the conveyors and to support them as illustrated in FIGS. 5 and 7. Springs 29 are tensioned to normally pull gate brackets 31 against the stop 33 to support the gate in the horizontal position. In use and as will be fully explained later, indexing and compression plates 30 cyclically pass downwardly through the upper portion of the stacking chamber, open the indexing gates 22 and 24 against their spring loading and carry the batts 12 supported thereby past the indexing gates to the portion of the stacking chamber below the indexing gates. Once the indexing compression plates 30 have passed through the indexing gates, the stretched springs thereof contract to return the gates 22 and 24 to the solid line position of FIGS. 5, 7 and 8 to receive more batts 12 from the feed conveyor belts 14 and 20.

Figure 3:
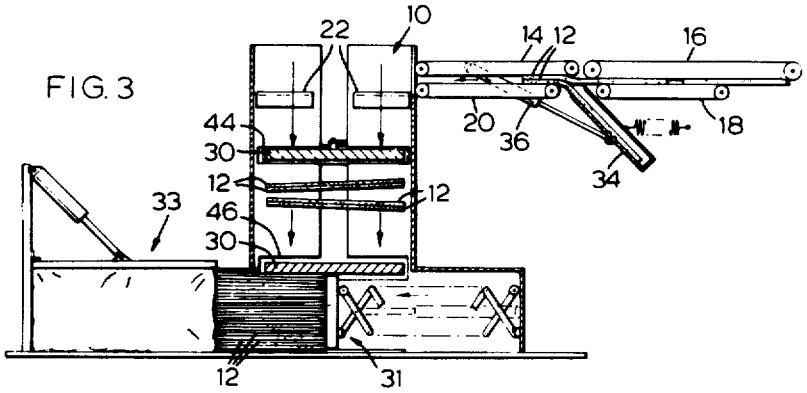
Figure 4:
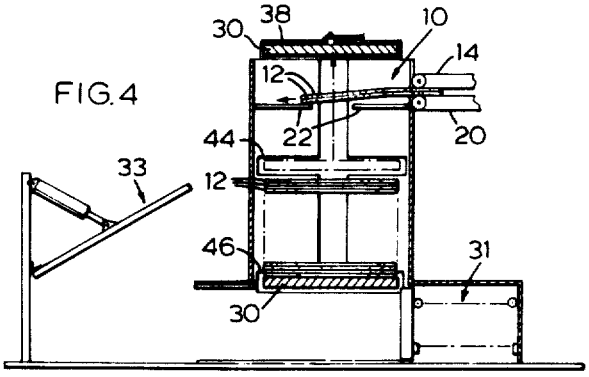

Reference will now be made to the operation of the feed conveyor belts 14, 16, 18 and 20. These belts are suitably mounted on rollers. Belts 14, 16 and 20 are driven (drive means not illustrated). Belt 18 operates on idler rollers. The batt 12 is continuously drawn from a feed table (not shown) by belt 16 and fed between belts 16 and 18. As two batts are being fed to the indexing gates 22 and 24 a batt enters the sheath 34 which is swingably mounted and assumes the position illustrated in FIG. 2 when it is receiving a batt. When the batt has entered the sheath 34 to the extent illustrated in FIG. 2, the sheath 34 is actuated to the position illustrated in FIG. 3 by means of a pneumatic cylinder 36. The forward edge of the next following batt engages with the trailing edge of the batt in the sheath and the two edges proceed towards the stacking chamber between the rollers 14 and 20 as shown in FIG. 3. Thus, the batts are fed to the machine, one on top of the other, the bottom one being drawn from the sheath and the top one coming from between the feed rolls 16 and 18. In FIG. 4, the double batts 12 are illustrated as they are being deposited on the indexing gates 22 and 24.

Figure 2:
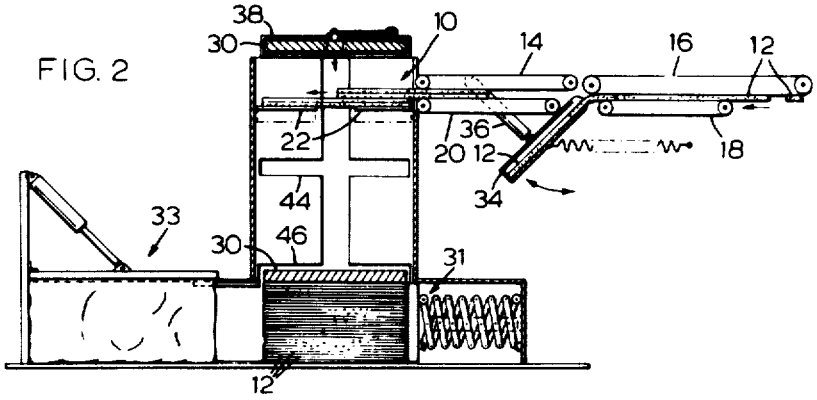
FIGS. 2, 3 and 4 are a series of elevations, partly in section, illustrating the operation of the conveyor system to the apparatus and the ejection system from the apparatus.

It will be apparent that by the time the double batt formation is deposited on the indexing gates 22 and 24, a following batt will have been fed into the sheath 34 which has been returned to the position illustrated in FIG. 2 and the sequence repeats. Thus, batts are presented in pairs at timed intervals to the indexing gates 22 and 24. The interval of time between the arrival of the batts gives the indexing compression plates 30 an opportunity to carry the batts through the indexing gates 22 and 24 and permit the doors to return to their normal receiving position before the arrival of the next following group of batts.

In the embodiment of the invention illustrated, there are two indexing and compression plates 30 which operate from opposite sides of the stacking chamber and which co-operate with each other to move the batts through the receiving gates as they are intermittently received thereon and to compress the batts into bundles of predetermined size for ejection from the bottom of the stack into a bagging device. As will be explained later, each of the indexing and compression plates cycles through the indexing gates a predetermined number of times to admit a predetermined number of batts to the stacking chamber and then proceeds downwardly to compress the predetermined number of batts for [latteral] *lateral* removal from the stacking chamber. While one indexing and compression plate performs its compression function and holds the compressed batts for removal by the ejection system, the other indexing and compression plate commences to cycle through the indexing gates to measure out a further predetermined number of batts for subsequent compression by it.

FIG. 1 illustrates the relationship of the indexing and compression plates 30 to the stacking chamber 10. The indexing and compression plates move vertically and horizontally. They are each mounted in a sheath 38 which is in turn mounted on the free end of a lazy tongs mechanism, generally indicated by the numeral 40. As illustrated in FIG. 1A, a pneumatic cylinder 42 connects with an arm of the lazy tongs mechanism 40 to raise and lower the sheaths 38 that carry the indexing compression plates 30 between the raised position illustrated on the back wall of the stacking chamber 10 and the lowered position illustrated on the front wall of the stacking chamber 10 in FIG. 1.

The indexing compression plates 30 also move inwardly and outwardly of their respective sheaths 38 to enter the stacking chamber 10 at the upper end thereof as illustrated on the back wall of FIG. 1 and to exit from the stacking chamber through slots 44 just below the indexing gates 22 and 24 and through slots 46 at the compression level of the index compression plates. Each of the front and back walls of the stacking chamber 10 has a vertical slot to permit the passage of the supporting arms of the compression plates as they travel vertically within the stacking chamber. The cyclic motion of the stacking plates will be referred to later in greater detail.

Each of the indexing plates 30 has a rod 48 that telescopes within a channel member 50 as it extends into and out of its respective sheath during its horizontal travel. Movement horizontally into and out of the sheath is controlled by a crank arm 52, which is pivoted to the sheath as at 54 and has one end pivotally connected to the piston of a pneumatic cylinder 56. The other end of each crank is slotted and pivotally connects with a pin its respective rods 48. It will be apparent that outward movement of a piston 56 will cause its crank to rotate and move its indexing compression plate to its outward position where it enters the stacking chamber. Retraction of a piston will cause movement of its crank to retract its indexing compression plate into its respective sheath.

Thus, it is apparent that by appropriate control of hydraulic cylinders 56, the indexing compression plates 30 can be moved in a horizontal direction either outside or inside the stacking chamber. Reference will now be made to the cyclic operation of the indexing compression plates.

Each of the compression plates 30 moves through a similar cycle, but the cyclic movement of the one is timed with respect to the cyclic movement of the other to achieve a combined indexing and compression function.

In FIG. 1, the lower indexing compression plate 30 has been moved downwardly by its lazy tongs mechanism 40 which is similar to tongs mechanism on upper indexing and compression plates to compress all of the batts 22 that underlie and that are below the compression level which is at the height of the transverse ejection passage. FIG. 5 illustrates the lower compression plate in a similar position. It will be noted that the stacking chamber has an ejection passage therethrough and when the batts are compressed beneath a compression plate, as illustrated in FIG. 5, a ram passes through the ejection passage in the stacking chamber to eject the compressed batts into a package. The ejection of compressed batts from a stacking chamber underlying a pressure plate is not new and is not referred to in detail in this specification. As indicated above, this invention is concerned with the operation of the indexing compression plates which in the embodiment illustrated combine to index and compress the batts for subsequent ejection and wrapping.

The lazy tongs mechanism for raising and lowering the indexing and compression plate is schematically illustrated in FIG. 1A. The tongs are pivotably connected at their top end to the sheath 38 as at 39 and at their bottom end to the base of the machine as at 41. The tongs have a rolling contact with the sheath as at 43 and a rolling contact with the floor as at 45. As the piston of pneumatic cylinder moves in and out, the sheath of the indexing and compression plate is lowered and raised as required.

FIGS. 5 to 8 illustrate the cyclic movement of the two indexing and compression plates 30 as they carry batts through the indexing gates and then compress them when a predetermined number of batts have passed through the gates.

Each of the compression plates cycle about two paths, one through the indexing gates to admit batts to the stack and the other through the indexing gates to admit batts to the stack and compress a predetermined number of batts in the stack. The paths in the case of each gate are similar except that they originate from opposite sides of the stack. One compression plate cooperates with the other to provide a continuous indexing and compression function.

Figure 8:
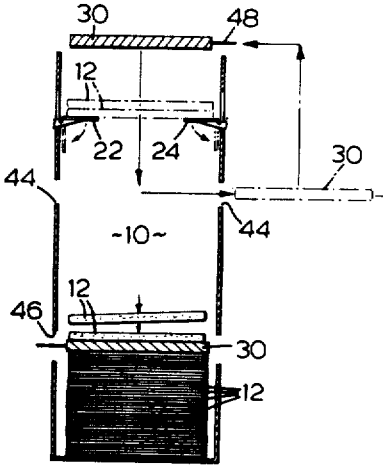
Figure 9:
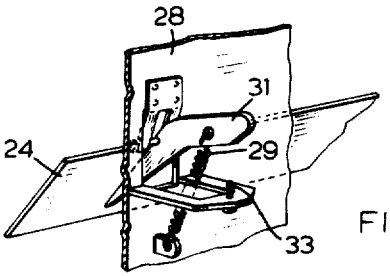
FIG. 9 is a perspective illustration of the spring action of the indexing gates.

FIG. 8 is an illustration where the plate 30 that is in the lower position has just previously moved downwardly to compress all batts therebeneath to the level of the ejection passage. This is similar to the position of the machine as illustrated in FIG. 1 of the drawings. While the lower indexing and compression plate 30 holds the batts therebeneath, the ejection system generally indicated by numeral 31 pushes the compressed batts through the ejection passage of the stacking chamber and into a bagging machine generally indicated by the numeral 33 for delivery as a package and then returns to its starting position. The ejection and bagging functions are schematically illustrated in FIGS. 2 to 4. They are well known in the art and not illustrated in detail because they do not form part of this invention. Any of several known ejection and bagging systems could be used.

Figure 6:
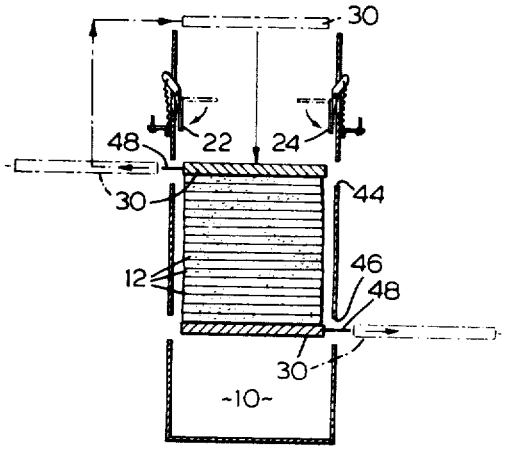
Figure 7:
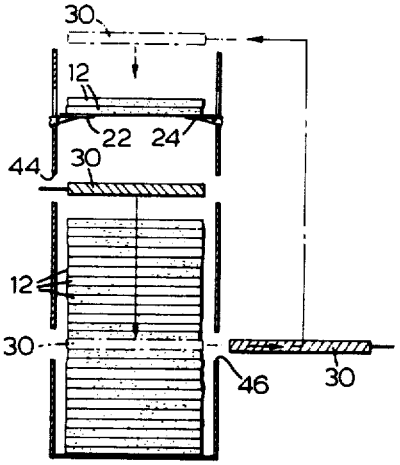

After the ejection passage of the stacking chamber has been cleared of compressed batts that underlie the lower compression plate as viewed in FIG. 8, the lower compression plate moves laterally out of the stacking chamber as illustrated in FIG. 6.

In the meantime, and during the period of time that the ejection mechanism removed the compressed batts, the upper indexing and compression plate cycles through the indexing gates to pile batts received from the feed conveyor system on top of the lower indexing and compression plate in the lower portion of the stacking chamber. This is schematically illustrated in FIG. 5. When the lower compression plate is removed from the stack as indicated in FIG. 6, the batts that previously overlaid the lower compression plate fall to the bottom of the stacking chamber as illustrated in FIG. 7. The upper indexing and compression plate continues to cycle and carry further batts through the indexing gate and into the stack until the required number for a package have been added to the pile. When this occurs, the upper indexing and compression plate continues downwardly to compress the batts in the stacking chamber to the level of the ejection passage as illustrated in FIG. 8 and the ejection mechanism 31 operates to remove them from the stack and into the bagging system 33 as just referred to.

When this occurs, the compression plate that was previously the lower compression plate, and which upon leaving the stack moved to the upper position and remained at the ready to recommence cycling again, starts to cycle through the indexing gates to add more batts to the stack above the indexing plate that is holding the batts in the compressed position.

The cycles are continuous.

It will thus be apparent that each of the indexing and compression plates 30 cycle around a first path a predetermined number of times for the purpose of admitting a predetermined number of batts to the stack and then cycle around a path that, in addition, compresses the previously indexed number of batts. In the machine illustrated, the first path extends from a place of beginning outside the stacking chamber at a level above the receiving gates 22, 24 where it can enter the top of the stack, then laterally into the stack, then downwardly in the stacking chamber through the receiving gates 22, 24 to drop batts deposited thereon into the lower portion of the stack as illustrated, then laterally out of the stacking chamber and then upwardly to the place of beginning as indicated in FIG. 8. It will be apparent that an indexing and compression plate cycling on such a path into and out of the stacking chamber will admit batts to the stack through the indexing gates each cycle.

The second path travelled by each of the indexing and compression plates is a path that is travelled only once for every predetermined number of passes of the first path. Its function is to compress and it commences from a place of beginning outside the stacking chamber at a level above the receiving gate as in the case of path 1 then laterally into the stacking chamber then downwardly in the stacking chamber through the receiving gates to the compression level in a lower portion of the stacking chamber which is substantially below the extent of downward travel of the first path then laterally out of the stacking chamber through opening 46 and then upwardly to the place of beginning.

In the embodiment of the invention illustrated, the dwell location for the indexing and compression plates has been indicated as above the level of the indexing gates on the sides of the stack. It could, however, be anywhere on the outside of the stack.

It will thus be apparent that each of the indexing stacking plates have a similar cyclic movement and that one of them is continuously making the short cycle at the top of the stacking chamber to count the number of batts stacked. Once the required number has been admitted to the stack, the indexing compression chamber doing the indexing drops to compress those batts and the other indexing compression chamber takes over the indexing function.

The horizontal movement of the indexing compression plates is simply achieved by the lever motion illustrated and a vertical movement is simply achieved by the lazy tongs mechanism illustrated. In each case hydraulic control is provided, but it will be apparent that the device could be controlled pneumatically or by electrically operated motor solenoids or the like.

The belt speed of the drive belts 16 and 18 can be up to 240 feet per minute, in which case 60 batts having a length of four feet would pass a given point per minute. With the stacking arrangement provided for by the sheath 34 there would be 30 double batts per minute presented to the indexing gates at time intervals of two seconds. The indexing compression plates are therefore cycled around their indexing path at 30 cycles per minute.

It is contemplated that up to 54 batts should be compressed at the compression position and the ejection mechanism for ejecting these batts is capable of operating in nine seconds, so that the pressure plate in the compression position can be withdrawn from the stacking chamber before any substantial amount of batts have been piled thereabove. This gives the complete height of the stacking chamber for stacking of the batts to be compressed and contributes to a compact low stacking machine.

The control and timing of the various functions of the machine is thought to be a matter of skill and subject to variation depending on the mechanical and the control devices available. In the machine illustrated, a photocell is located in the end of the sheath 34 as at 62 which senses the full entry of a batt in the position of FIG. 2. When so alerted, the photocell operates an electrical circuit that operates pneumatic cylinder 36 to swing the sheath 34 to the position of FIG. 2 and the batt contained thereby is withdrawn therefrom as the belts continue to feed the next following batt as illustrated in FIG. 3.

After the batt in the sheath is withdrawn therefrom, the photocell resets. After a time delay sufficient for the batt to be withdrawn, the pneumatic cylinder 36 is operated back to its original position illustrated in FIG. 1 ready to receive a following batt.

The double ply batts are fed towards the stacking chamber between the belts 14 and 20 and when they reach the forward end of the belts 14 and 20, they energize photocell located as at 64. Photocell 64 is connected into a control circuit to determine the passage of the back end of a pair of batts therepast. When the back ends of a pair of batts pass photocell 64, they are effectively delivered to the spring loaded indexing gates 22 and 24. Within a short time delay of about one-half of a second past the photocell 64, an indexing and compression plate is operated from a place outside the stacking chamber laterally into the stacking chamber at a level above the indexing gates, downwardly in the stacking chamber through the indexing gates and then laterally out of the stacking chamber as described above. This operation essentially drops the batts through the indexing gates.

As photocell 64 operates an indexing and compression plate through its cycle to drop a pair of batts through the indexing gates, it operates a counter. The counter is set up to cause the indexing gate to cycle through the stacking chamber a predetermined number of times and then to proceed down to the compression level. Thus, the counter which is electrically connected to the photocell 64 counts the number of batts that are admitted to the stacking chamber between compression cycles of an indexing and compression plate. The plate dwells at the compression level for removal of the compressed batts and the other plate cycles to admit more batts as described above.

Limit switches determine the extent of travel of each of the indexing and compression plates in each direction for each of their cycles. Thus, a limit switch determines the extent of the inward travel of each of the compression plates at the upper end of the compression chamber as illustrated in FIGS. 5 and 6; a limit switch determines the extent of downward travel of each of the compression plates at the level where it cycles from the compression chamber without compressing the batts. A limit switch determines the extent of travel of the compression plates as they compress batts as illustrated in FIGS. 5 and 6. A limit switch determines the extent of outward travel of the compression plates at the compression level as illustrated in FIG. 7. A limit switch determines the travel of the indexing and compression plates in an upward direction to the dwell level as indicated in FIG. 8 and a limit switch determines the extent of upward travel of the plates as they cycle on the outside of the stack as indicated by the arrow on FIGS. 7 and 8.

The wiring and relay devices which respond to the photocells and limit switches to achieve the control operation described are of conventional design and connection and are not described in detail in this specification. The embodiment of the invention illustrated is thought to be a most desirable one, but other embodiments will be apparent to those skilled in the art. For example, if one were satisfied with a dwell in operation, it would be possible to provide for only a single indexing and compression plate. In this case, it would be necessary to arrange for intermittent stopping of the supply to the bin while the single plate was in the compression position and the compressed batts were being removed. By providing for two compression plates, one can have continuous feed to the stacking chamber.

The invention has been described in relation to the compressing of glass fiber batts but it will be appreciated that its use is not restricted thereto. It could be used for compressing any compressible material that is to be packaged in the way described.

What I claim as my invention is:

1. Apparatus for stacking and compressing batts of compressible material comprising:

i. a vertical stacking chamber, ii. indexing gates in the upper portion of said stacking chamber normally disposed to receive batts, iii. an indexing and compression plate, iv. means for repeatedly cycling said indexing and compression plate around a first path [a predetermined number of times and then] *and* around a second path [once], v. said first path extending upwardly of the outside *of* said stacking chamber laterally into said stacking chamber at a level above said indexing gates, downwardly in said stacking chamber, through said indexing gates, and laterally out of said stacking chamber, said second path extending upwardly of the outside of said stacking chamber, laterally into said stacking chamber, downwardly in said stacking chamber to a compression level in the lower portion thereof that is below the extent of downward travel of said first path and laterally out of said stacking chamber, vi. said indexing gates being operable in response to the passage therethrough of said indexing and compression plate to permit said indexing and compression plate to carry batts thereon to the portion of said stacking chamber therebelow, vii. an ejection passage extending across said stacking chamber at the lower end thereof and below said compression level through which batts underlying said index and compression plate at the compression level can be laterally removed from said stacking chamber, viii. means for ejecting batts underlying said indexing and compression plate when said indexing and compression plate is at said compression level, ix. said means for repeatedly cycling said indexing and compression plate being adapted to remove said compression plate out of said stacking chamber on said second path after operation of said means for ejecting batts.

2. Apparatus for stacking and compressing batts of compressible material as claimed in claim 1 including:

i. a second indexing and compression plate, ii. means for repeatedly cycling said second indexing and compression plate around a third path [a predetermined number of times and then] *and* around a fourth path [once], iii. said third path extending upwardly of the outside *of* said stacking chamber laterally into said stacking chamber at a level above said receiving gates, downwardly in said stacking chamber through said indexing gates, and laterally out of said stacking chamber, said fourth path extending upwardly of the outside *of* said stacking chamber laterally into said stacking chamber, downwardly in said stacking chamber to a compression level in the lower portion thereof that is below the extent of downward travel of said third path and laterally out of said stacking chamber,

[iv. means for repeatedly cycling said second indexing and compression plate around said third path a predetermined number of times and then around said fourth path once,]

[v] *iv.* said means for repeatedly cycling said first mentioned indexing and compression plate and said means for repeatedly cycling said second indexing and compression plate being adapted to cycle said first mentioned indexing and compression plate around said first path a predetermined number of times [as aforesaid] and then to cycle said second indexing and compression plate around said third path a predetermined number of times [as aforesaid] on a repetitive basis whereby one or other of said indexing and compression plates is continuously cycling through said receiving gates.

[3. Apparatus for stacking and compressing batts of compressible material as claimed in claim 1 having:

i. feed means for intermittently feeding more than one batt of compressible material at a time to said indexing gates in overlying relation, ii. said feed means comprising a first conveyor, iii. a sheath having an open end to receive a single batt, iv. a second conveyor, v. said sheath being normally disposed with its open end to receive a batt from said first conveyor and to return it with its trailing end extending therefrom, vi. means for temporarily swinging said sheath from its normal position after it has received a batt as aforesaid from said first conveyor to locate the trailing end of a batt contained therein in the path of the underside of a next following batt on said first conveyor with its trailing edge pointed in the direction of conveyor travel, said second conveyor being adapted to receive and convey a batt from said sheath and a batt from said first conveyor in overlying relation and deposit them on said indexing and compression gates in overlying relation.]

* * * * *